United States Patent
Deninger et al.

(10) Patent No.: US 7,818,326 B2
(45) Date of Patent: Oct. 19, 2010

(54) SYSTEM AND METHOD FOR WORD INDEXING IN A CAPTURE SYSTEM AND QUERYING THEREOF

(75) Inventors: William Deninger, San Jose, CA (US); Erik de la Iglesia, Mountain View, CA (US)

(73) Assignee: McAfee, Inc., Santa Clara, CA (US)

( * ) Notice: Subject to any disclaimer, the term of this patent is extended or adjusted under 35 U.S.C. 154(b) by 439 days.

(21) Appl. No.: 11/218,167

(22) Filed: Aug. 31, 2005

(65) Prior Publication Data

US 2007/0050334 A1   Mar. 1, 2007

(51) Int. Cl.
*G06F 17/30* (2006.01)

(52) U.S. Cl. .................. 707/747; 707/769; 711/216

(58) Field of Classification Search .............. 707/2, 707/3, 999.002, 999.03, 747, 769; 711/216
See application file for complete search history.

(56) References Cited

U.S. PATENT DOCUMENTS

| | | | |
|---|---|---|---|
| 4,286,255 A | 8/1981 | Siy | |
| 4,710,957 A | 12/1987 | Bocci et al. | |
| 5,465,299 A | 11/1995 | Matsumoto et al. | |
| 5,557,747 A | 9/1996 | Rogers et al. | |
| 5,768,578 A | 6/1998 | Kirk | |
| 5,781,629 A | 7/1998 | Haber et al. | |
| 5,794,052 A | 8/1998 | Harding | |
| 5,943,670 A | 8/1999 | Prager | |
| 5,995,111 A | 11/1999 | Morioka et al. | |
| 6,078,953 A | 6/2000 | Vaid et al. | |
| 6,094,531 A | 7/2000 | Allison et al. | |
| 6,108,697 A | 8/2000 | Raymond et al. | |
| 6,175,867 B1 | 1/2001 | Taghadoss | |
| 6,192,472 B1 | 2/2001 | Garay et al. | |
| 6,243,091 B1 | 6/2001 | Berstis | |
| 6,292,810 B1 | 9/2001 | Richards | |
| 6,356,885 B2 | 3/2002 | Ross et al. | |
| 6,408,294 B1 | 6/2002 | Getchius et al. | |
| 6,493,761 B1 | 12/2002 | Baker et al. | |
| 6,499,105 B1 | 12/2002 | Yoshiura et al. | |
| 6,515,681 B1 | 2/2003 | Knight | |
| 6,523,026 B1 * | 2/2003 | Gillis | 707/3 |
| 6,539,024 B1 | 3/2003 | Janoska et al. | |
| 6,571,275 B1 | 5/2003 | Dong et al. | |

(Continued)

OTHER PUBLICATIONS

U.S. Appl. No. 12/190,536, filed Aug. 12, 2008, entitled "Configuration Management for a Capture/Registration System," Inventor(s) Jitendra B. Gaitonde et al. (P032).

(Continued)

*Primary Examiner*—Hosain T Alam
*Assistant Examiner*—Jieying Tang
(74) *Attorney, Agent, or Firm*—Patent Capital Group

(57) ABSTRACT

Searching of objects captured by a capture system can be improved by eliminating irrelevant objects from a query. In one embodiment, the present invention includes receiving such a query for objects captured by a capture system, the query including at least one search term. This search term is then hashed to a term bit position using a hash function. Then objects can be eliminated if, in a word index associated with the object, the term bit position is not set.

22 Claims, 9 Drawing Sheets

U.S. PATENT DOCUMENTS

| | | |
|---|---|---|
| 6,598,033 B2 | 7/2003 | Ross et al. |
| 6,662,176 B2 | 12/2003 | Brunet et al. |
| 6,691,209 B1 | 2/2004 | O'Connell |
| 6,771,595 B1 | 8/2004 | Gilbert et al. |
| 6,772,214 B1 | 8/2004 | McClain et al. |
| 6,785,815 B1 | 8/2004 | Serret-Avila et al. |
| 6,820,082 B1 | 11/2004 | Cook et al. |
| 6,857,011 B2 | 2/2005 | Reinke |
| 6,937,257 B1 | 8/2005 | Dunlavey |
| 6,950,864 B1 | 9/2005 | Tsuchiya |
| 6,978,297 B1 | 12/2005 | Piersol |
| 7,020,654 B1 | 3/2006 | Najmi |
| 7,020,661 B1 * | 3/2006 | Cruanes et al. ......... 707/103 R |
| 7,062,572 B1 | 6/2006 | Hampton |
| 7,072,967 B1 | 7/2006 | Saulpaugh et al. |
| 7,082,443 B1 | 7/2006 | Ashby |
| 7,093,288 B1 | 8/2006 | Hydrie et al. |
| 7,130,587 B2 | 10/2006 | Hikokubo et al. |
| 7,158,983 B2 | 1/2007 | Willse et al. |
| 7,185,073 B1 | 2/2007 | Gai et al. |
| 7,185,192 B1 | 2/2007 | Kahn |
| 7,219,131 B2 | 5/2007 | Banister et al. |
| 7,219,134 B2 | 5/2007 | Takeshima et al. |
| 7,243,120 B2 | 7/2007 | Massey |
| 7,246,236 B2 | 7/2007 | Stirbu |
| 7,254,562 B2 | 8/2007 | Hsu et al. |
| 7,266,845 B2 | 9/2007 | Hypponen |
| 7,277,957 B2 | 10/2007 | Rowley et al. |
| 7,290,048 B1 | 10/2007 | Barnett et al. |
| 7,296,070 B2 | 11/2007 | Sweeney et al. |
| 7,296,088 B1 | 11/2007 | Padmanabhan et al. |
| 7,299,277 B1 | 11/2007 | Moran et al. |
| 7,373,500 B2 * | 5/2008 | Ramelson et al. ......... 713/150 |
| 7,424,744 B1 | 9/2008 | Wu et al. |
| 7,426,181 B1 | 9/2008 | Feroz et al. |
| 7,434,058 B2 | 10/2008 | Ahuja et al. |
| 7,477,780 B2 | 1/2009 | Boncyk et al. |
| 7,483,916 B2 | 1/2009 | Lowe et al. |
| 7,493,659 B1 | 2/2009 | Wu et al. |
| 7,506,055 B2 | 3/2009 | McClain et al. |
| 7,509,677 B2 | 3/2009 | Saurabh et al. |
| 7,516,492 B1 | 4/2009 | Nisbet et al. |
| 7,551,629 B2 | 6/2009 | Chen et al. |
| 7,596,571 B2 | 9/2009 | Sifry |
| 7,664,083 B1 | 2/2010 | Cermak et al. |
| 2001/0037324 A1 * | 11/2001 | Agrawal et al. ............ 707/1 |
| 2002/0032677 A1 | 3/2002 | Morgenthaler et al. |
| 2002/0052896 A1 | 5/2002 | Streit et al. |
| 2002/0078355 A1 | 6/2002 | Samar |
| 2002/0091579 A1 | 7/2002 | Yehia et al. |
| 2002/0103876 A1 * | 8/2002 | Chatani et al. ............ 709/217 |
| 2002/0107843 A1 | 8/2002 | Biebesheimer et al. |
| 2002/0116124 A1 | 8/2002 | Garin et al. |
| 2002/0126673 A1 | 9/2002 | Dagli et al. |
| 2002/0129140 A1 | 9/2002 | Peled et al. |
| 2002/0159447 A1 | 10/2002 | Carey et al. |
| 2003/0009718 A1 | 1/2003 | Wolfgang et al. |
| 2003/0028493 A1 | 2/2003 | Tajima |
| 2003/0028774 A1 | 2/2003 | Meka |
| 2003/0046369 A1 | 3/2003 | Sim et al. |
| 2003/0053420 A1 | 3/2003 | Duckett et al. |
| 2003/0065571 A1 | 4/2003 | Dutta |
| 2003/0084300 A1 | 5/2003 | Koike |
| 2003/0084318 A1 | 5/2003 | Schertz |
| 2003/0084326 A1 | 5/2003 | Tarquini |
| 2003/0093678 A1 | 5/2003 | Bowe et al. |
| 2003/0099243 A1 | 5/2003 | Oh et al. |
| 2003/0105739 A1 | 6/2003 | Essafi et al. |
| 2003/0131116 A1 | 7/2003 | Jain et al. |
| 2003/0135612 A1 | 7/2003 | Huntington |
| 2003/0185220 A1 | 10/2003 | Valenci |
| 2003/0196081 A1 | 10/2003 | Savarda et al. |
| 2003/0204741 A1 | 10/2003 | Schoen et al. |
| 2003/0221101 A1 | 11/2003 | Micali |
| 2003/0225796 A1 | 12/2003 | Matsubara |
| 2003/0225841 A1 | 12/2003 | Song et al. |
| 2003/0231632 A1 | 12/2003 | Haeberlen |
| 2004/0059736 A1 | 3/2004 | Willse et al. |
| 2004/0071164 A1 | 4/2004 | Baum |
| 2004/0111678 A1 | 6/2004 | Hara |
| 2004/0114518 A1 | 6/2004 | MacFaden et al. |
| 2004/0117414 A1 | 6/2004 | Braun et al. |
| 2004/0120325 A1 | 6/2004 | Ayres |
| 2004/0122863 A1 | 6/2004 | Sidman |
| 2004/0181513 A1 | 9/2004 | Henderson et al. |
| 2004/0181690 A1 | 9/2004 | Rothermel et al. |
| 2004/0194141 A1 | 9/2004 | Sanders |
| 2004/0196970 A1 | 10/2004 | Cole |
| 2004/0230572 A1 | 11/2004 | Omoigui |
| 2004/0267753 A1 * | 12/2004 | Hoche ............ 707/9 |
| 2005/0004911 A1 | 1/2005 | Goldberg et al. |
| 2005/0021715 A1 | 1/2005 | Dugatkin et al. |
| 2005/0021743 A1 | 1/2005 | Fleig et al. |
| 2005/0022114 A1 | 1/2005 | Shanahan et al. |
| 2005/0027881 A1 | 2/2005 | Figueira et al. |
| 2005/0033747 A1 | 2/2005 | Wittkotter |
| 2005/0033803 A1 | 2/2005 | Vleet et al. |
| 2005/0038809 A1 | 2/2005 | Abajian et al. |
| 2005/0050205 A1 | 3/2005 | Gordy et al. |
| 2005/0055327 A1 * | 3/2005 | Agrawal et al. ............ 707/1 |
| 2005/0055399 A1 | 3/2005 | Savchuk |
| 2005/0091443 A1 * | 4/2005 | Hershkovich et al. ....... 711/100 |
| 2005/0091532 A1 | 4/2005 | Moghe |
| 2005/0108244 A1 | 5/2005 | Riise et al. |
| 2005/0114452 A1 | 5/2005 | Prakash |
| 2005/0120006 A1 | 6/2005 | Nye |
| 2005/0127171 A1 | 6/2005 | Ahuja et al. |
| 2005/0128242 A1 | 6/2005 | Suzuki |
| 2005/0131876 A1 | 6/2005 | Ahuja et al. |
| 2005/0132034 A1 | 6/2005 | de la Iglesia et al. |
| 2005/0132046 A1 | 6/2005 | de la Iglesia et al. |
| 2005/0132079 A1 | 6/2005 | de la Iglesia et al. |
| 2005/0132197 A1 | 6/2005 | Medlar |
| 2005/0132198 A1 | 6/2005 | Ahuja et al. |
| 2005/0132297 A1 | 6/2005 | Milic-Frayling et al. |
| 2005/0138242 A1 | 6/2005 | Pope et al. |
| 2005/0138279 A1 | 6/2005 | Somasundaram |
| 2005/0149504 A1 | 7/2005 | Ratnaparkhi |
| 2005/0166066 A1 | 7/2005 | Ahuja et al. |
| 2005/0177725 A1 | 8/2005 | Lowe et al. |
| 2005/0180341 A1 | 8/2005 | Nelson et al. |
| 2005/0203940 A1 | 9/2005 | Farrar et al. |
| 2005/0204129 A1 | 9/2005 | Sudia et al. |
| 2005/0228864 A1 | 10/2005 | Robertson |
| 2005/0235153 A1 | 10/2005 | Ikeda |
| 2005/0289181 A1 | 12/2005 | Deninger et al. |
| 2006/0005247 A1 * | 1/2006 | Zhang et al. ............ 726/26 |
| 2006/0021045 A1 | 1/2006 | Cook |
| 2006/0021050 A1 | 1/2006 | Cook et al. |
| 2006/0037072 A1 | 2/2006 | Rao et al. |
| 2006/0041560 A1 | 2/2006 | Forman et al. |
| 2006/0041570 A1 | 2/2006 | Lowe et al. |
| 2006/0041760 A1 | 2/2006 | Huang |
| 2006/0047675 A1 | 3/2006 | Lowe et al. |
| 2006/0083180 A1 | 4/2006 | Baba et al. |
| 2006/0167896 A1 | 7/2006 | Kapur et al. |
| 2006/0184532 A1 | 8/2006 | Hamada et al. |
| 2006/0242126 A1 * | 10/2006 | Fitzhugh ............ 707/3 |
| 2006/0242313 A1 | 10/2006 | Le et al. |
| 2006/0251109 A1 | 11/2006 | Muller et al. |
| 2006/0272024 A1 | 11/2006 | Huang et al. |
| 2006/0288216 A1 | 12/2006 | Buhler et al. |
| 2007/0006293 A1 * | 1/2007 | Balakrishnan et al. ......... 726/13 |
| 2007/0036156 A1 | 2/2007 | Liu et al. |

| | | | |
|---|---|---|---|
| 2007/0050381 A1 | 3/2007 | Hu et al. |
| 2007/0094394 A1 | 4/2007 | Singh et al. |
| 2007/0110089 A1 | 5/2007 | Essafi et al. |
| 2007/0116366 A1 | 5/2007 | Deninger et al. |
| 2007/0136599 A1 | 6/2007 | Suga |
| 2007/0162609 A1 | 7/2007 | Pope et al. |
| 2007/0226504 A1 | 9/2007 | de la Iglesia et al. |
| 2007/0226510 A1 | 9/2007 | de la Iglesia et al. |
| 2007/0248029 A1 | 10/2007 | Merkey et al. |
| 2007/0271254 A1 | 11/2007 | de la Iglesia et al. |
| 2007/0271371 A1 | 11/2007 | Ahuja et al. |
| 2007/0271372 A1 | 11/2007 | Deninger et al. |
| 2007/0280123 A1 | 12/2007 | Atkins et al. |
| 2008/0028467 A1 | 1/2008 | Kommareddy et al. |
| 2010/0185622 A1 | 7/2010 | Deninger et al. |

OTHER PUBLICATIONS

U.S. Appl. No. 12/352,720, filed Jan. 13, 2009, entitled "System and Method for Concept Building," Inventor(s) Ratinder Paul Singh Ahuja et al. (004796-1040).

U.S. Appl. No. 12/354,688, filed Jan. 15, 2009, entitled "System and Method for Intelligent Term Grouping," Inventor(s) Ratinder Paul Ahuja et al. (004796-1041).

U.S. Appl. No. 12/358,399, filed Jan. 23, 2009, entitled "System and Method for Intelligent State Management," Inventor(s) William Deninger et al. (004796-1042).

U.S. Appl. No. 12/410,875, filed Mar. 25, 2009, entitled "System and Method for Data Mining and Security Policy Management," Inventor(s) Ratinder Paul Singh Ahuja et al. (004796-1043).

U.S. Appl. No. 12/410,905, filed Mar. 25, 2009, entitled "System and Method for Managing Data and Policies," Inventor(s) Ratinder Paul Singh Ahuja et al. (004796-1044).

Preneel, Bart, "Cryptographic Hash Functions", Proceedings of the 3$^{rd}$ Symposium on State and Progress of Research in Cryptography, 1993, pp. 161-171.

U.S. Appl. No. 12/360,537, filed Jan. 27, 2009, entitled "Database for a Capture System," Inventor(s) Rick Lowe et al. (P014-DIV).

U.S. Appl. No. 11/254,436, filed Oct. 19, 2005, entitled "Attributes of Captured Objects in a Capture System," Inventor(s) William Deninger et al.

U.S. Appl. No. 12/472,150, filed May 26, 2009, entitled "Identifying Image Type in a Capture System," Inventor(s) William Deninger et al.

U.S. Appl. No. 11/900,964, filed Sep. 14, 2007, entitled "System and Method for Indexing a Capture System," Inventor(s) Ashok Doddapaneni et al.

U.S. Appl. No. 12/171,232, filed Jul. 10, 2008, entitled "System and Method for Data Mining and Security Policy Management," Inventor(s) Weimin Liu et al.

Microsoft Outlook, Outlook, copyright 1995-2000, 2 pages.

Chapter 1. Introduction, "Computer Program product for analyzing network traffic," Ethereal. Computer program product for analyzing network traffic, pp. 17-26, http://web.archive.org/web/20030315045117/www.ethereal.com/distribution/docs/user-guide, printed Mar. 12, 2009.

U.S. Appl. No. 12/690,153, filed Jan. 20, 2010, entitled "Query Generation for a Capture System," Inventor(s) Erik de la Iglesia, et al.

* cited by examiner

SYSTEM AND METHOD FOR WORD INDEXING IN A CAPTURE SYSTEM AND QUERYING THEREOF

FIELD OF THE INVENTION

The present invention relates to computer networks, and in particular, to a network interface.

BACKGROUND

Computer networks and systems have become indispensable tools for modern business. Modern enterprises use such networks for communications and for storage. The information and data stored on the network of a business enterprise is often a highly valuable asset. Modern enterprises use numerous tools to keep outsiders, intruders, and unauthorized personnel from accessing valuable information stored on the network. These tools include firewalls, intrusion detection systems, and packet sniffer devices. However, once an intruder has gained access to sensitive content, there is no network device that can prevent the electronic transmission of the content from the network to outside the network. Similarly, there is no network device that can analyse the data leaving the network to monitor for policy violations, and make it possible to track down information leeks. What is needed is a comprehensive system to capture, store, and analyse all data communicated using the enterprises network.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION

Although the present system will be discussed with reference to various illustrated examples, these examples should not be read to limit the broader spirit and scope of the present invention. Some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated.

It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As indicated above, one embodiment of the present invention is instantiated in computer software, that is, computer readable instructions, which, when executed by one or more computer processors/systems, instruct the processors/systems to perform the designated actions. Such computer software may be resident in one or more computer readable media, such as hard drives, CD-ROMs, DVD-ROMs, read-only memory, read-write memory and so on. Such software may be distributed on one or more of these media, or may be made available for download across one or more computer networks (e.g., the Internet). Regardless of the format, the computer programming, rendering and processing techniques discussed herein are simply examples of the types of programming, rendering and processing techniques that may be used to implement aspects of the present invention. These examples should in no way limit the present invention, which is best understood with reference to the claims that follow this description.

Networks

Figure 1:
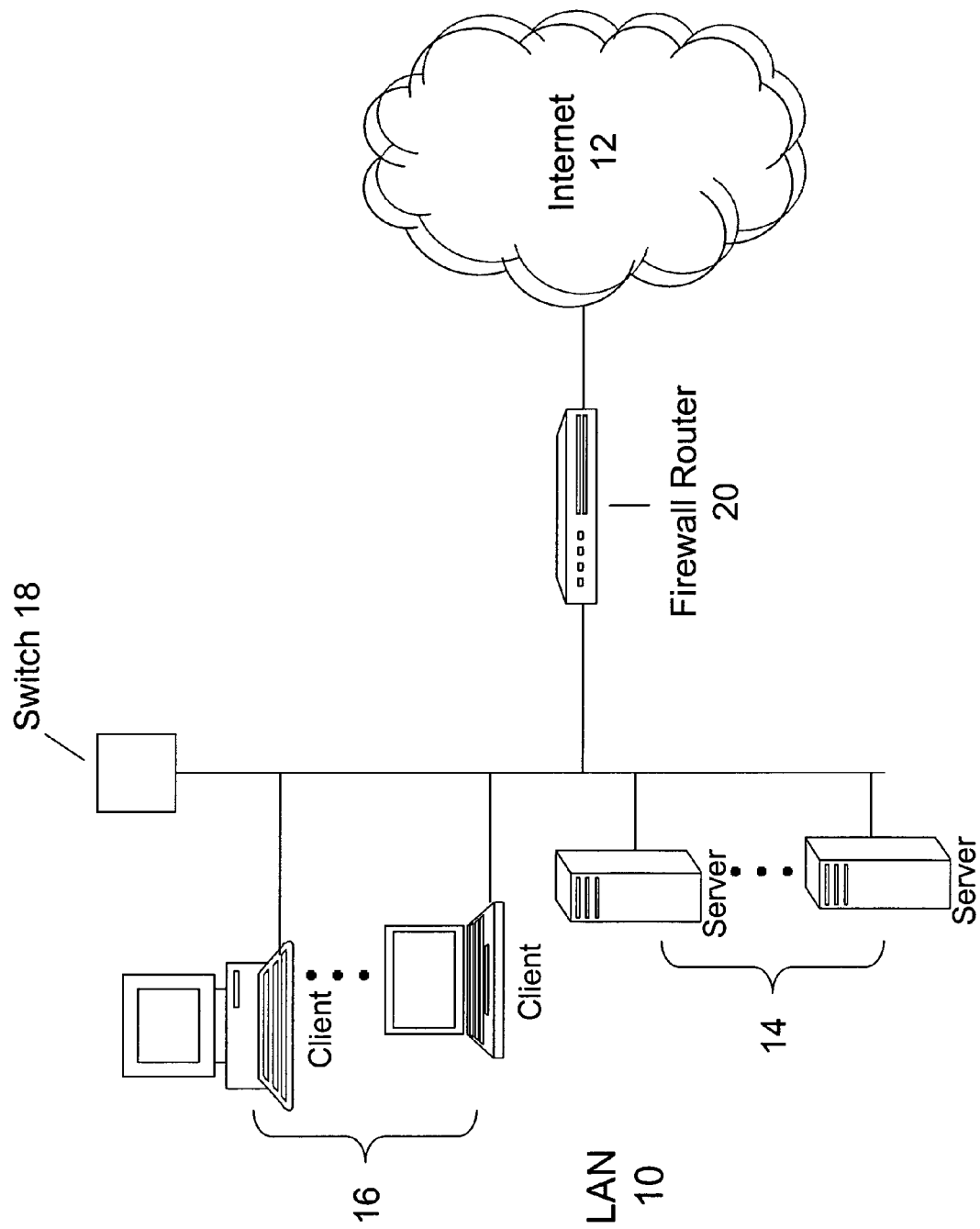
FIG. 1 is a block diagram illustrating a computer network connected to the Internet.

FIG. 1 illustrates a simple prior art configuration of a local area network (LAN) 10 connected to the Internet 12. Connected to the LAN 102 are various components, such as servers 14, clients 16, and switch 18. There are numerous other known networking components and computing devices that can be connected to the LAN 10. The LAN 10 can be implemented using various wireline or wireless technologies, such as Ethernet and 802.11b. The LAN 10 may be much more complex than the simplified diagram in FIG. 1, and may be connected to other LANs as well.

In FIG. 1, the LAN 10 is connected to the Internet 12 via a router 20. This router 20 can be used to implement a firewall, which are widely used to give users of the LAN 10 secure access to the Internet 12 as well as to separate a company's public Web server (can be one of the servers 14) from its internal network, i.e., LAN 10. In one embodiment, any data leaving the LAN 10 towards the Internet 12 must pass through the router 12. However, there the router 20 merely forwards packets to the Internet 12. The router 20 cannot capture, analyze, and searchably store the content contained in the forwarded packets.

Figure 2:
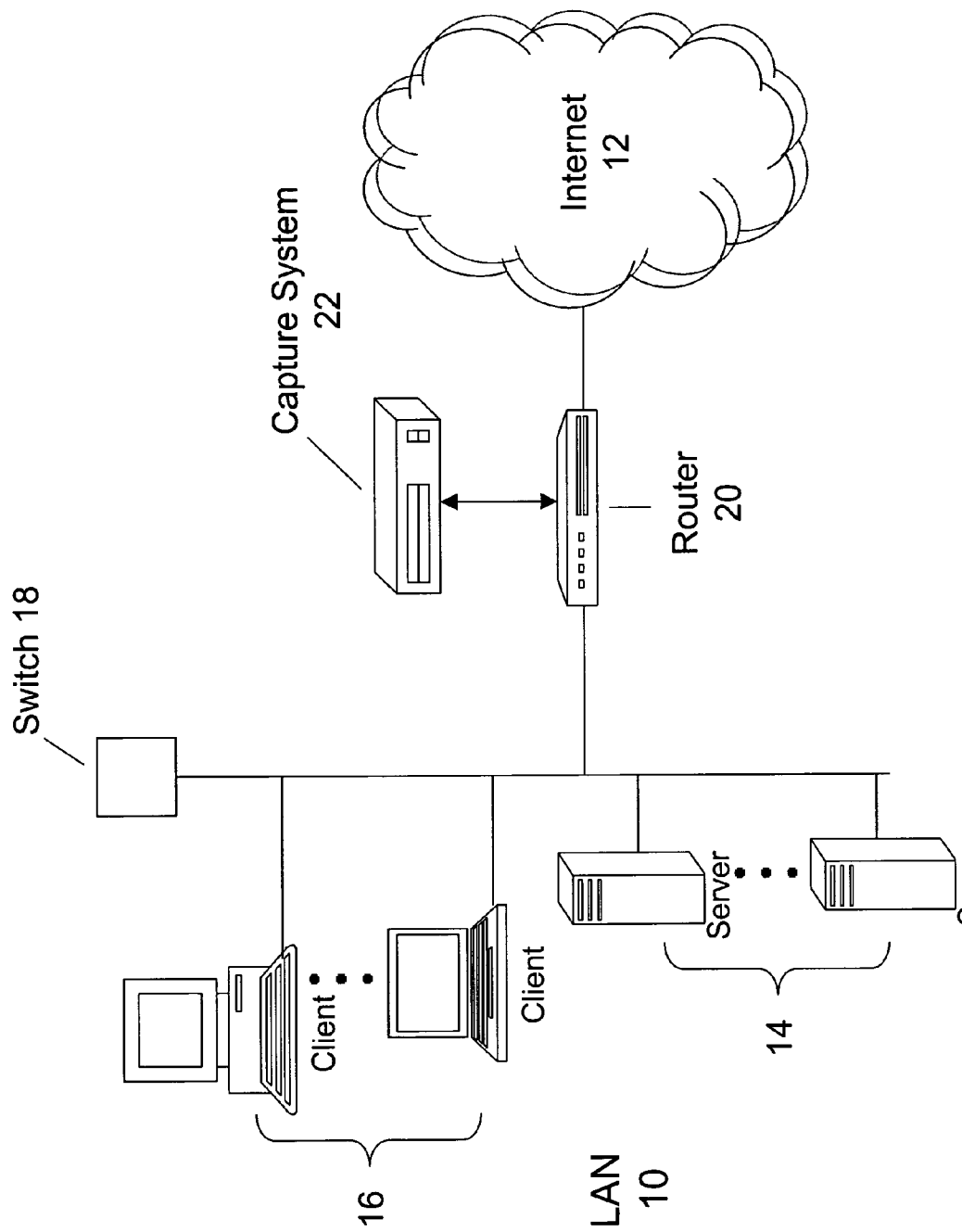
FIG. 2 is a block diagram illustrating one configuration of a capture system according to one embodiment of the present invention.

One embodiment of the present invention is now illustrated with reference to FIG. 2. FIG. 2 shows the same simplified configuration of connecting the LAN 10 to the Internet 12 via the router 20. However, in FIG. 2, the router 20 is also connected to a capture system 22. In one embodiment, the router 12 splits the outgoing data stream, and forwards one copy to the Internet 12 and the other copy to the capture system 22.

There are various other possible configurations. For example, the router 12 can also forward a copy of all incoming data to the capture system 22 as well. Furthermore, the capture system 22 can be configured sequentially in front of, or behind the router 20, however this makes the capture system 22 a critical component in connecting to the Internet 12. In systems where a router 12 is not used at all, the capture system can be interposed directly between the LAN 10 and the Internet 12. In one embodiment, the capture system 22 has a user interface accessible from a LAN-attached device, such as a client 16.

In one embodiment, the capture system 22 intercepts all data leaving the network. In other embodiments, the capture system can also intercept all data being communicated inside the network 10. In one embodiment, the capture system 22 reconstructs the documents leaving the network 10, and stores them in a searchable fashion. The capture system 22 can then be used to search and sort through all documents that have left the network 10. There are many reasons such documents may be of interest, including network security reasons, intellectual property concerns, corporate governance regulations, and other corporate policy concerns.

Capture System

Figure 3:
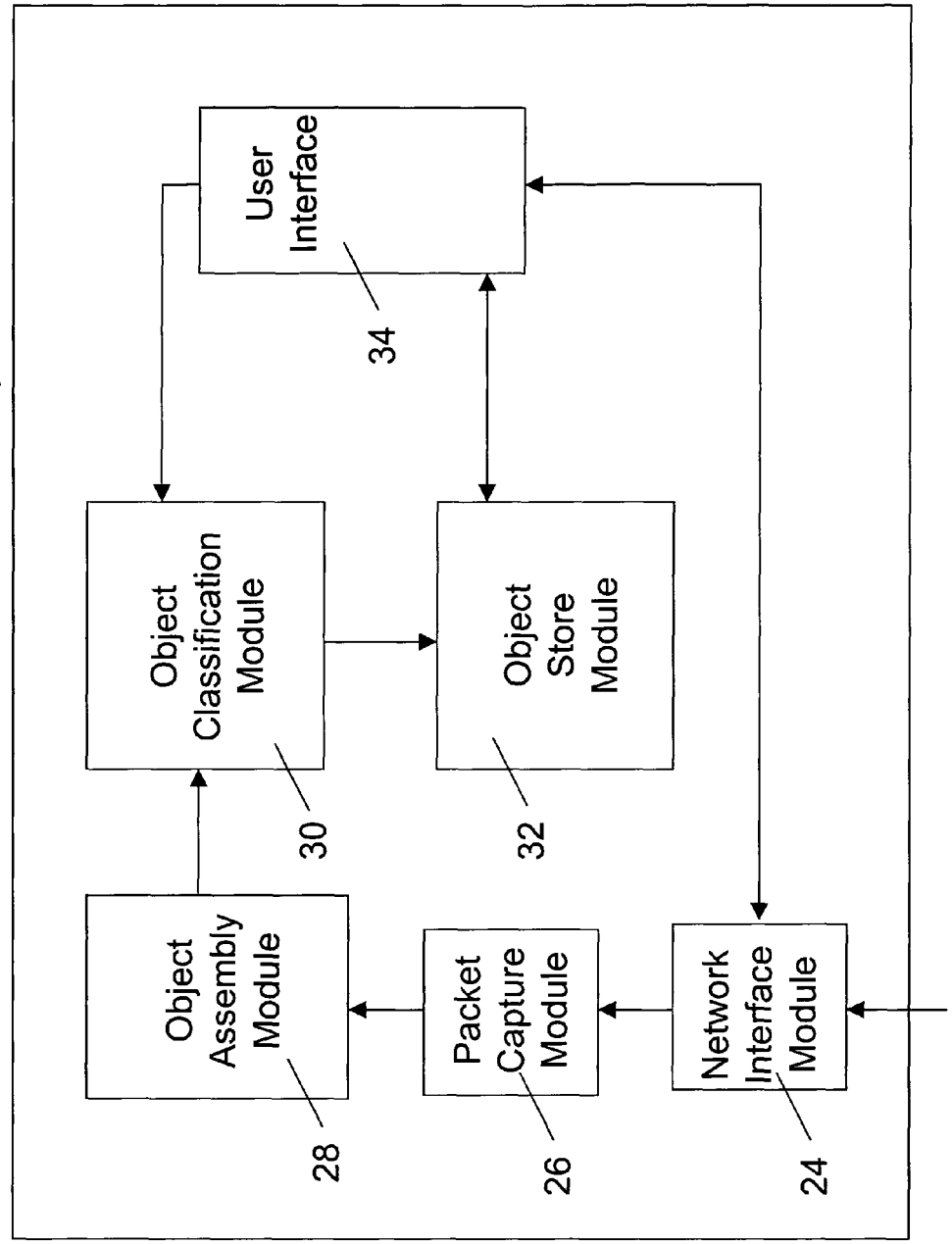
FIG. 3 is a block diagram illustrating the capture system according to one embodiment of the present invention.

One embodiment of the present invention is now described with reference to FIG. 3. FIG. 3 shows one embodiment of the capture system 22 in more detail. The capture system 22 includes a network interface module 24 to receive the data from the network 10 or the router 20. In one embodiment, the network interface module 24 is implemented using one or more network interface cards (NIC), e.g., Ethernet cards. In one embodiment, the router 20 delivers all data leaving the network to the network interface module 24.

The captured raw data is then passed to a packet capture module 26. In one embodiment, the packet capture module 26 extracts data packets from the data stream received from the network interface module 24. In one embodiment, the packet capture module 26 reconstructs Ethernet packets from multiple sources to multiple destinations for the raw data stream.

In one embodiment, the packets are then provided the object assembly module 28. The object assembly module 28 reconstructs the objects being transmitted by the packets. For example, when a document is transmitted, e.g. as an email attachment, it is broken down into packets according to various data transfer protocols such as Transmission Control Protocol/Internet Protocol (TCP/IP) and Ethernet. The object assembly module 28 can reconstruct the document from the captured packets.

Figure 4:
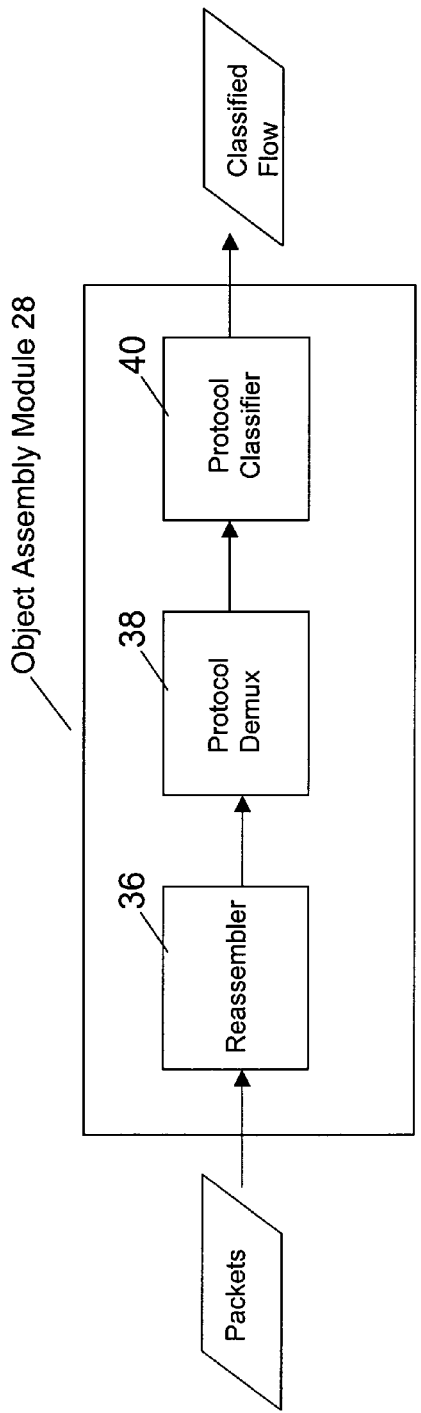
FIG. 4 is a block diagram illustrating an object assembly module according to one embodiment of the present invention.

One embodiment of the object assembly module 28 is now described in more detail with reference to FIG. 4. When packets first enter the object assembly module, they are first provided to a reassembler 36. In one embodiment, the reassembler 36 groups—assembles—the packets into unique flows. For example, a flow can be defined as packets with identical Source IP and Destination IP addresses as well as identical TCP Source and Destination Ports. That is, the reassembler 36 can organize a packet stream by sender and recipient.

In one embodiment, the reassembler 36 begins a new flow upon the observation of a starting packet defined by the data transfer protocol. For a TCP/IP embodiment, the starting packet is generally referred to as the "SYN" packet. The flow can terminate upon observation of a finishing packet, e.g., a "Reset" or "FIN" packet in TCP/IP. If now finishing packet is observed by the reassembler 36 within some time constraint, it can terminate the flow via a timeout mechanism. In an embodiment using the TPC protocol, a TCP flow contains an ordered sequence of packets that can be assembled into a contiguous data stream by the ressembler 36. Thus, in one embodiment, a flow is an ordered data stream of a single communication between a source and a destination.

The flown assembled by the reassember 36 can then is provided to a protocol demultiplexer (demux) 38. In one embodiment, the protocol demux 38 sorts assembled flows using the TCP Ports. This can include performing a speculative classification of the flow contents based on the association of well-known port numbers with specified protocols. For example, Web Hyper Text Transfer Protocol (HTTP) packets—i.e., Web traffic—are typically associated with port 80, File Transfer Protocol (FTP) packets with port 20, Kerberos authentication packets with port 88, and so on. Thus in one embodiment, the protocol demux 38 separates all the different protocols in one flow.

In one embodiment, a protocol classifier 40 also sorts the flows in addition to the protocol demux 38. In one embodiment, the protocol classifier 40—operating either in parallel or in sequence with the protocol demux 38—applies signature filters to the flows to attempt to identify the protocol based solely on the transported data. Furthermore, the protocol demux 38 can make a classification decision based on port number, which is subsequently overridden by protocol classifier 40. For example, if an individual or program attempted to masquerade an illicit communication (such as file sharing) using an apparently benign port such as port 80 (commonly used for HTTP Web browsing), the protocol classifier 40 would use protocol signatures, i.e., the characteristic data sequences of defined protocols, to verify the speculative classification performed by protocol demux 38.

In one embodiment, the object assembly module 28 outputs each flow organized by protocol, which represent the underlying objects. Referring again to FIG. 3, these objects can then be handed over to the object classification module 30 (sometimes also referred to as the "content classifier") for classification based on content. A classified flow may still contain multiple content objects depending on the protocol used. For example, protocols such as HTTP (Internet Web Surfing) may contain over 100 objects of any number of content types in a single flow. To deconstruct the flow, each object contained in the flow is individually extracted, and decoded, if necessary, by the object classification module 30.

The object classification module 30 uses the inherent properties and signatures of various documents to determine the content type of each object. For example, a Word document has a signature that is distinct from a PowerPoint document, or an Email document. The object classification module 30 can extract out each individual object and sort them out by such content types. Such classification renders the present invention immune from cases where a malicious user has altered a file extension or other property in an attempt to avoid detection of illicit activity.

In one embodiment, the object classification module 30 determines whether each object should be stored or discarded. In one embodiment, this determination is based on a various capture rules. For example, a capture rule can indicate that Web Traffic should be discarded. Another capture rule can indicate that all PowerPoint documents should be stored, except for ones originating from the CEO's IP address. Such capture rules can be implemented as regular expressions, or by other similar means. Several embodiments of the object classification module 30 are described in more detail further below.

In one embodiment, the capture rules are authored by users of the capture system 22. The capture system 22 is made accessible to any network-connected machine through the network interface module 24 and user interface 34. In one embodiment, the user interface 34 is a graphical user interface providing the user with friendly access to the various features of the capture system 22. For example, the user interface 34 can provide a capture rule authoring tool that allows users to write and implement any capture rule desired, which are then applied by the object classification module 30 when determining whether each object should be stored. The user interface 34 can also provide pre-configured capture rules that the user can select from along with an explanation of the operation of such standard included capture rules. In one embodiment, the default capture rule implemented by the object classification module 30 captures all objects leaving the network 10.

Figure 5:
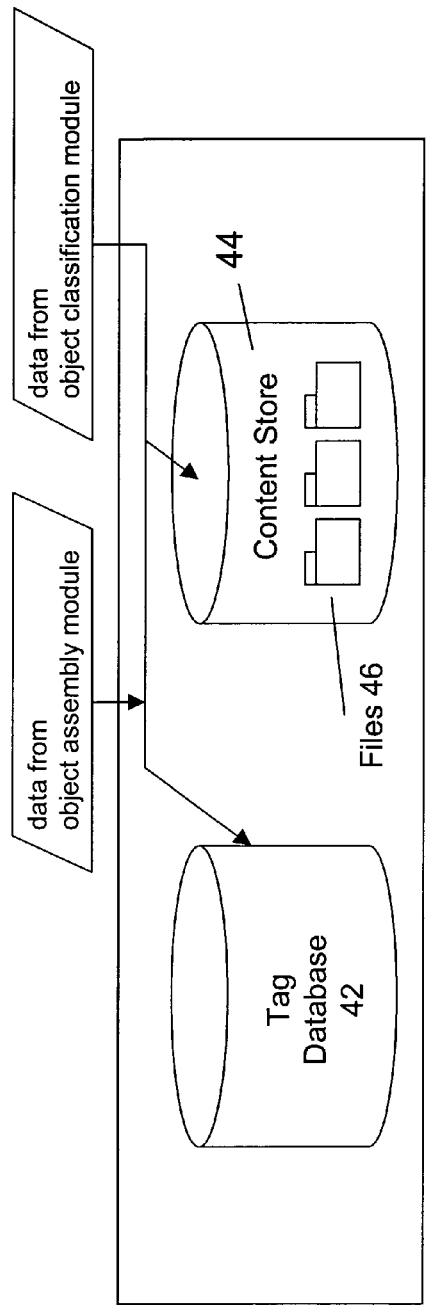
FIG. 5 is a block diagram illustrating an object store module according to one embodiment of the present invention.

If the capture of an object is mandated by the capture rules, the object classification module 30 can also determine where in the object store module 32 the captured object should be stored. With reference to FIG. 5, in one embodiment, the objects are stored in a content store 44 memory block. Within the content store 44 are files 46 divided up by content type. Thus, for example, if the object classification module determines that an object is a Word document that should be stored, it can store it in the file 46 reserved for Word documents. In one embodiment, the object store module 32 is integrally included in the capture system 22. In other embodiments, the object store module can be external—entirely or in part—using, for example, some network storage technique such as network attached storage (NAS) and storage area network (SAN).

Tag Data Structure

In one embodiment, the content store is a canonical storage location, simply a place to deposit the captured objects. The indexing of the objects stored in the content store 44 is accomplished using a tag database 42. In one embodiment, the tag database 42 is a database data structure in which each record is a "tag" that indexes an object in the content store 44 and contains relevant information about the stored object. An example of a tag record in the tag database 42 that indexes an object stored in the content store 44 is set forth in Table 1:

TABLE 1

| Field Name | Definition |
| --- | --- |
| MAC Address | Ethernet controller MAC address unique to each capture system |
| Source IP | Source Ethernet IP Address of object |
| Destination IP | Destination Ethernet IP Address of object |
| Source Port | Source TCP/IP Port number of object |
| Destination Port | Destination TCP/IP Port number of the object |
| Protocol | IP Protocol that carried the object |
| Instance | Canonical count identifying object within a protocol capable of carrying multiple data within a single TCP/IP connection |
| Content | Content type of the object |
| Encoding | Encoding used by the protocol carrying object |
| Size | Size of object |
| Timestamp | Time that the object was captured |
| Owner | User requesting the capture of object (rule author) |
| Configuration | Capture rule directing the capture of object |

TABLE 1-continued

| Field Name | Definition |
| --- | --- |
| Signature | Hash signature of object |
| Tag Signature | Hash signature of all preceding tag fields |

There are various other possible tag fields, and some embodiments can omit numerous tag fields listed in Table 1. In other embodiments, the tag database 42 need not be implemented as a database, and a tag need not be a record. Any data structure capable of indexing an object by storing relational data over the object can be used as a tag data structure. Furthermore, the word "tag" is merely descriptive, other names such as "index" or "relational data store," would be equally descriptive, as would any other designation performing similar functionality.

The mapping of tags to objects can, in one embodiment, be obtained by using unique combinations of tag fields to construct an object's name. For example, one such possible combination is an ordered list of the Source IP, Destination IP, Source Port, Destination Port, Instance and Timestamp. Many other such combinations including both shorter and longer names are possible. In another embodiment, the tag can contain a pointer to the storage location where the indexed object is stored.

The tag fields shown in Table 1 can be expressed more generally, to emphasize the underlying information indicated by the tag fields in various embodiments. Some of these possible generic tag fields are set forth in Table 2:

TABLE 2

| Field Name | Definition |
| --- | --- |
| Device Identity | Identifier of capture device |
| Source Address | Origination Address of object |
| Destination Address | Destination Address of object |
| Source Port | Origination Port of object |
| Destination Port | Destination Port of the object |
| Protocol | Protocol that carried the object |
| Instance | Canonical count identifying object within a protocol capable of carrying multiple data within a single connection |
| Content | Content type of the object |
| Encoding | Encoding used by the protocol carrying object |
| Size | Size of object |
| Timestamp | Time that the object was captured |
| Owner | User requesting the capture of object (rule author) |
| Configuration | Capture rule directing the capture of object |
| Signature | Signature of object |
| Tag Signature | Signature of all preceding tag fields |

For many of the above tag fields in Tables 1 and 2, the definition adequately describes the relational data contained by each field. For the content field, the types of content that the object can be labeled as are numerous. Some example choices for content types (as determined, in one embodiment, by the object classification module 30) are JPEG, GIF, BMP, TIFF, PNG (for objects containing images in these various formats); Skintone (for objects containing images exposing human skin); PDF, MSWord, Excel, PowerPoint, MSOffice (for objects in these popular application formats); HTML, WebMail, SMTP, FTP (for objects captured in these transmission formats); Telnet, Rlogin, Chat (for communication conducted using these methods); GZIP, ZIP, TAR (for archives or collections of other objects); Basic_Source, C++_Source, C_Source, Java_Source, FORTRAN_Source, Verilog_Source, VHDL_Source, Assembly_Source, Pascal- _Source, Cobol_Source, Ada_Source, Lisp_Source, Perl_Source, XQuery_Source, Hypertext Markup Language, Cascaded Style Sheets, JavaScript, DXF, Spice, Gerber, Mathematica, Matlab, AllegroPCB, ViewLogic, TangoPCAD, BSDL, C_Shell, K_Shell, Bash_Shell, Bourne_Shell, FTP, Telnet, MSExchange, POP3, RFC822, CVS, CMS, SQL, RTSP, MIME, PDF, PS (for source, markup, query, descriptive, and design code authored in these high-level programming languages); C Shell, K Shell, Bash Shell (for shell program scripts); Plaintext (for otherwise unclassified textual objects ); Crypto (for objects that have been encrypted or that contain cryptographic elements); Englishtext, Frenchtext, Germantext, Spanishtext, Japanesetext, Chinesetext, Koreantext, Russiantext (any human language text); Binary Unknown, ASCII Unknown, and Unknown (as catchall categories).

The signature contained in the Signature and Tag Signature fields can be any digest or hash over the object, or some portion thereof. In one embodiment, a well-known hash, such as MD5 or SHA1 can be used. In one embodiment, the signature is a digital cryptographic signature. In one embodiment, a digital cryptographic signature is a hash signature that is signed with the private key of the capture system 22. Only the capture system 22 knows its own private key, thus, the integrity of the stored object can be verified by comparing a hash of the stored object to the signature decrypted with the public key of the capture system 22, the private and public keys being a public key cryptosystem key pair. Thus, if a stored object is modified from when it was originally captured, the modification will cause the comparison to fail.

Similarly, the signature over the tag stored in the Tag Signature field can also be a digital cryptographic signature. In such an embodiment, the integrity of the tag can also be verified. In one embodiment, verification of the object using the signature, and the tag using the tag signature is performed whenever an object is presented, e.g., displayed to a user. In one embodiment, if the object or the tag is found to have been compromised, an alarm is generated to alert the user that the object displayed may not be identical to the object originally captured.

Word Indexing

When a user searches over the objects captured by the capture system 22, it is desirable to make the search as fast as possible. One way to speed up searches is known as word indexing. Traditionally, word indexing involves maintaining a dictionary of words, and a list of objects associated with each word, where each object on the list contains the word. This traditional approach has several disadvantages, including non-linear growth as the number of captured objects gets large.

In one embodiment, the present invention implements a novel word indexing scheme. One embodiment of the present invention is now described with reference to FIG. 7. In the embodiment described with reference to FIG. 7, the word indexing functionality is implemented in the object classification module 30 described above. However, the word indexing process and modules may be implemented in other parts of the capture system 22 or as a separate module.

Figure 7:
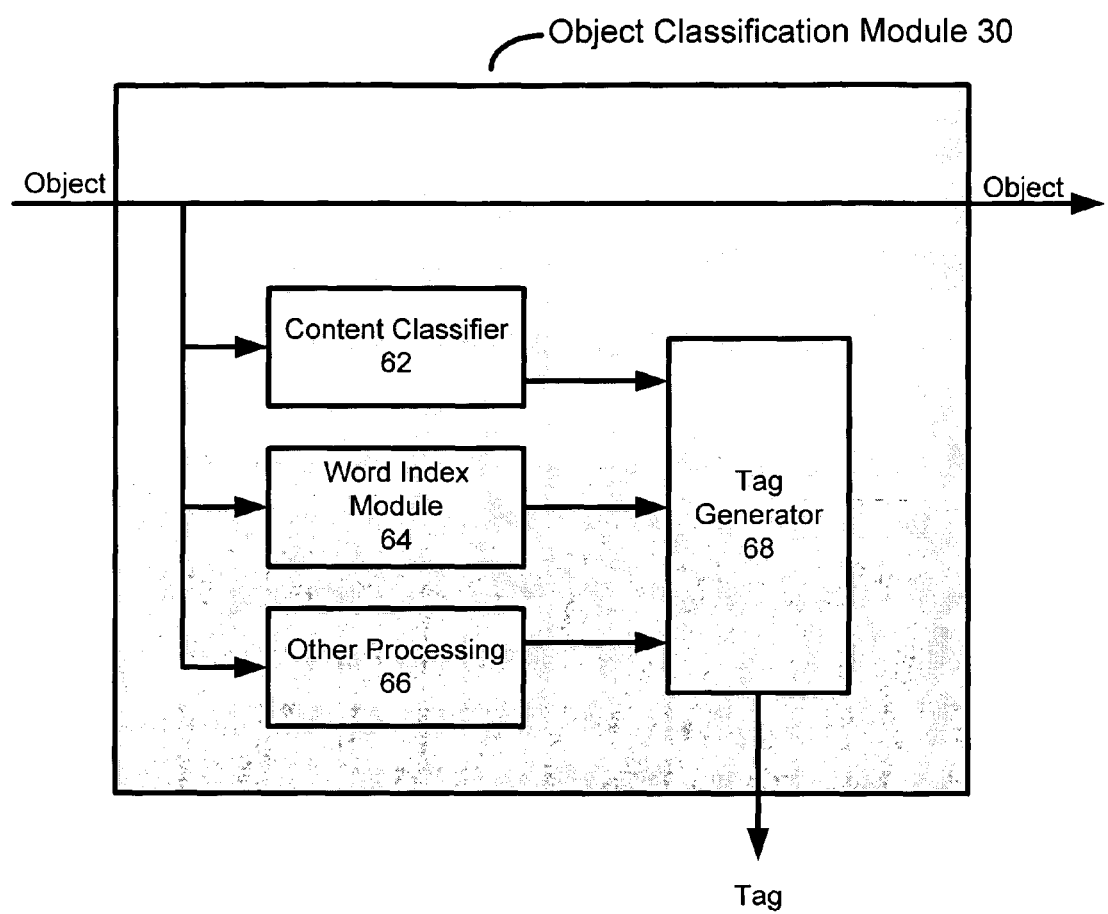
FIG. 7 is a block diagram illustrating an object classification module according to one embodiment of the present invention.

FIG. 7 illustrates a detailed diagram of one embodiment of the object classification module 30. Objects arriving from the object assembly module 28 are forwarded to the content store, and used to generate the tag to be associated with the object. For example, one module called the content classifier 62 can determine the content type of the object. The content type is then forwarded to the tag generator 68 where it is inserted into the content field described above. Various other such processing, such as protocol and size determination, is represented by other processing block 66.

In one embodiment, the word index module 64 generates an index that can be inserted into an index field of the tag by the tag generator 68. In one embodiment, the index is a binary number that can be used to quickly eliminate object from queries. One embodiment of such an index and how it works is now described with reference to FIG. 8.

Figure 8:
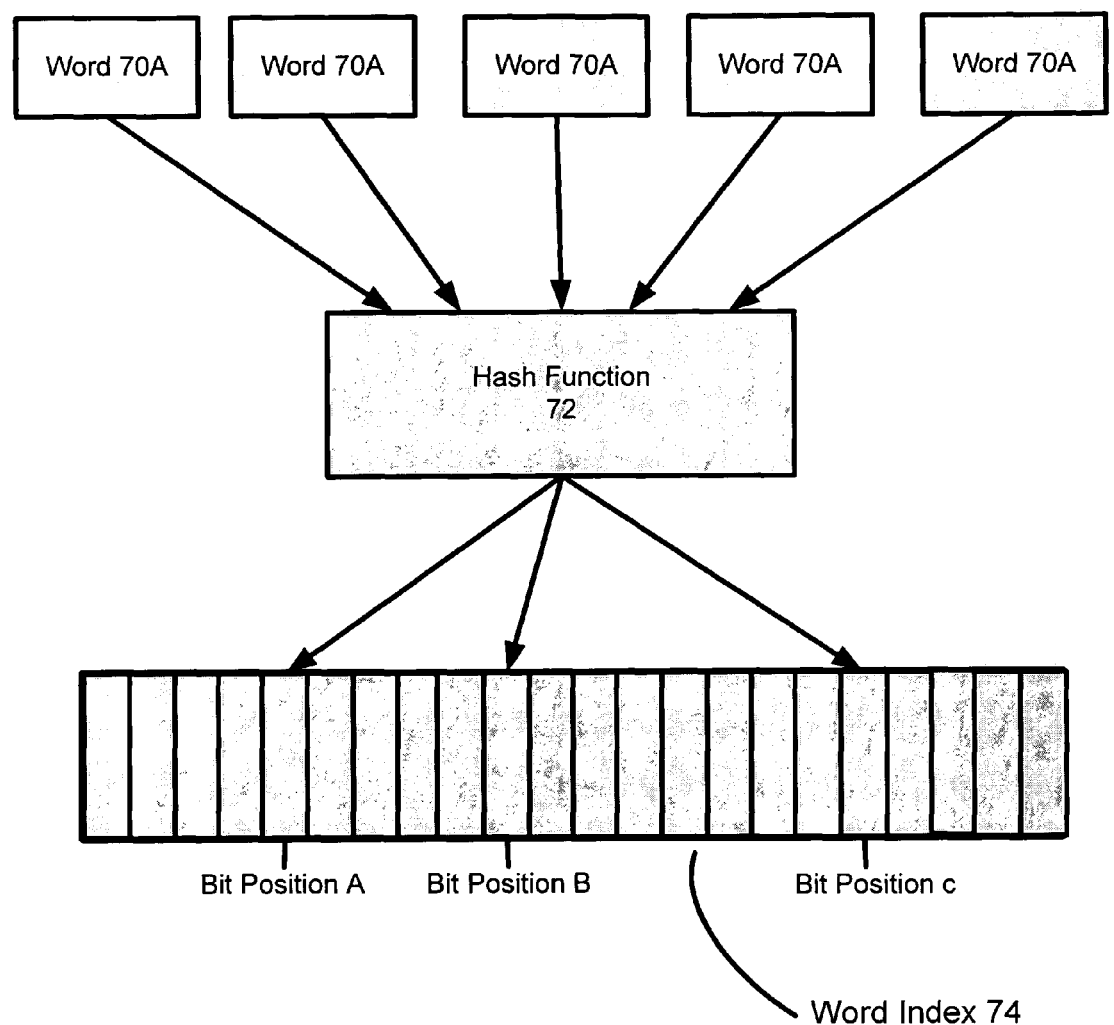
FIG. 8 is a block diagram illustrating bit vector generation according to one embodiment of the present invention.

FIG. 8 shows a plurality of words (labeled words 70A to 70E) belonging to a document, such as an email. A real life email may have more words, of course. Each word is hashed by hash function 72 to a number between 0 and some number X. In one embodiment, the word index 74 is implemented as a bit vector. The word index 74 can be a vector of bits with one bit position associated with each number between 0 and X. For example, in one embodiment, the word index has 1024 bits. In this embodiment, hash function 72 hashes each word 70 to a number between 0 and 1023.

Then, for each word 70, the bit position associated with the number that the word hashed to is "set." Setting the appropriate bit can involve a change from 0 to 1, or 1 to 0, depending on the default bits used to populate the word index 74. In one embodiment, all bits of the word index 74 are initialized to 0 and are set to 1 is a word hashes to that bit position.

Since there are more possible words than bit positions, multiple words 70 can hash to the same number causing the same bit to be set. Thus, the fact that a certain bit is set does not guarantee that a specific word appears in the document. However, if a word hashes to a bit that is not set, that word does not appear in the document.

For example, in FIG. 8, word 70B and 70E may both hash to bit position B of the word index 74, causing bit position B to be set to 1. If a query is issued to find documents containing word 70B or 70E, the document associated with this word index 74 is particularly relevant. Similarly, is a query is issued to find documents containing word 70B or 70E and bit position B is not set, then the document associated with this word index 74 can be disregarded.

There are other words not included in the document on FIG. 8 that hash to bit position B, e.g. word 70X (not shown). If a query is issued to find documents containing word 70X, the document associated with this word index 74 will not be disregarded, because bit position B will be set because the document contains word 70B and 70E.

Figure 9:
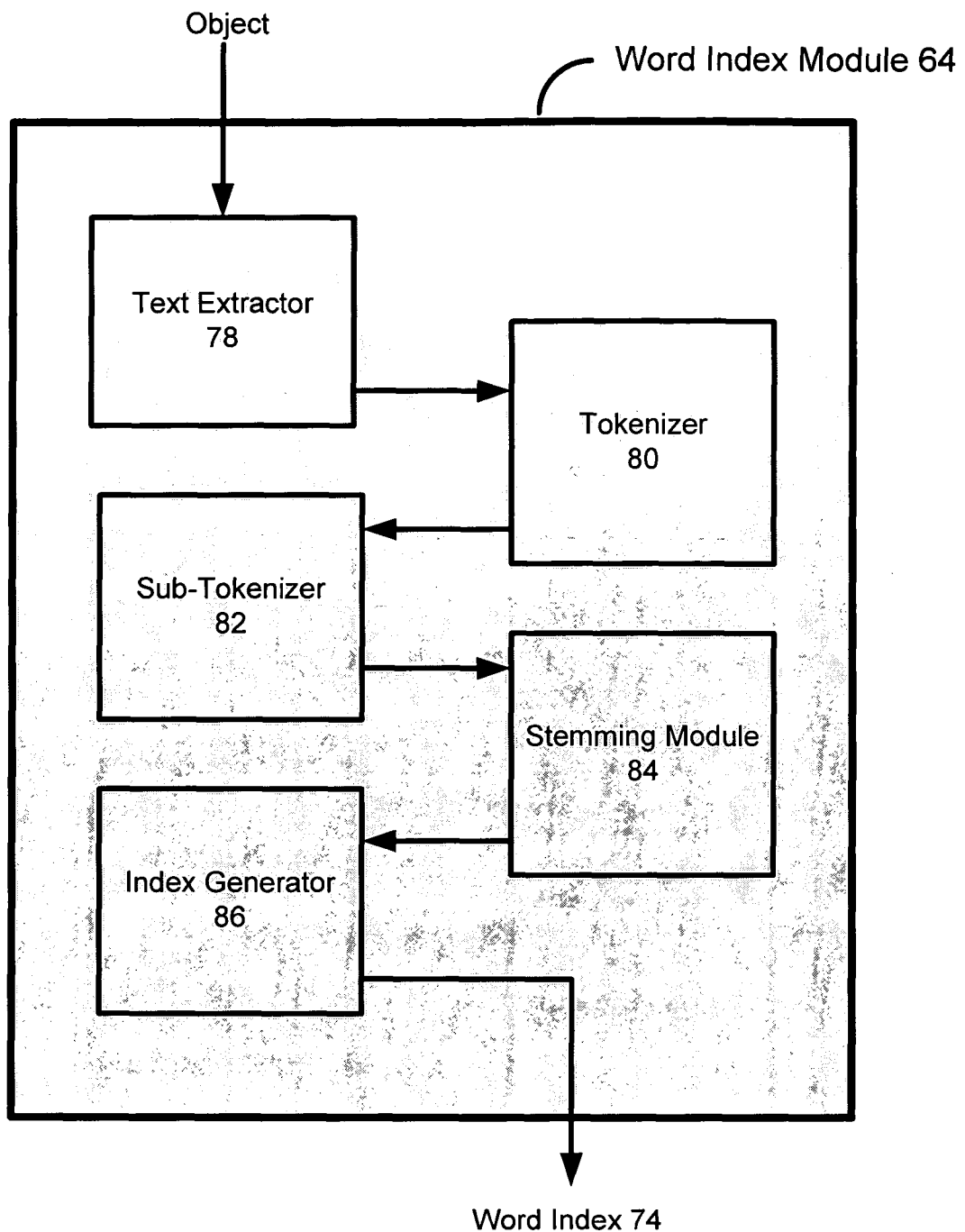
FIG. 9 is a block diagram illustrating a word index module according to one embodiment of the present invention.

With the above understanding of how the word index 74 works, one embodiment of the word index module 64 is now described with reference to FIG. 9. The input of the word index module 64, as set forth above, is a captured object captured by the object capture and assembly modules. The object may be a word document, email, spreadsheet, or some other document that includes text.

The object is first processed by a text extractor 78. In one embodiment, the text extractor 78 extracts the textual content from the captured object. The text content of objects includes only textual characters without formatting or application context. The plain text extracted from the object is then provided to a tokenizer 80. The tokenizer 80 creates tokens by breaking the text over separators.

Separators can be spaces, commas, semi-colons, slashes, dashes, or any other character designated as a separator. The tokenizer 80 may apply all available separators to each extracted text file, or a specific subset of separators based on the type of the object.

The tokens, which in large part will be words in most objects, are provided, in one embodiment, to a sub-tokenizer 82. The sub-tokenizer 82 breaks some tokens into multiple tokens. It can also use an existing token to generate one or more additional tokens. In one embodiment, the sub-tokenizer 82 operates in both a content- and context-specific manner.

For example, one token created by the tokenizer 80 from an email message is the email address of the sender (e.g., billybob@reconnex.net). Since this token is highly unique, it is of greater importance than other words, such as "Ethernet." While the "@" symbol may not be a generic separator, in the context of an email address, the information before and after the "@" symbol are highly unique and make searching emails from the sender easier. Thus, the sub-tokenizer 82 would add "billybob," and "reconnex.net" as additional tokens.

In one embodiment, this sub-tokenization is content- and context-specific. For example, the email address sub-tokenization may only be carried out on email objects and only in the source and recipient email address context. Other such sub-tokenization contexts and content include specific alphanumeric strings (strings containing letters and/or numbers) including but not limited to credit card numbers, social security numbers, alien registration numbers or other identification numbers. In these cases, the delimiting characters (for example dashes or spaces) may be ignored such that the entire string is tokenized as a single object. In another context, these same delimiting characters may cause separate tokens to be generated.

The complete set of tokens can then proceed to a stemming module 84. The stemming module 84 can be implemented to truncate tokens that appear in various forms. For example, the tokens "confidentially," and "confidential," can all be stemmed to the token "confidential."

The final list of tokens is then provided to the index generator 86. The index generator sets the bits that the tokens hashed to. Once a bit is set, another token hashing to the same bit does not change the bit setting. The word index 74 thus generated can than be inserted into the tag associated with the captured object by the tag generator 68.

In one embodiment, the word index can be inserted into the signature field described above. In another embodiment, a unique index field in the tag can contain the word index.

Figure 10:
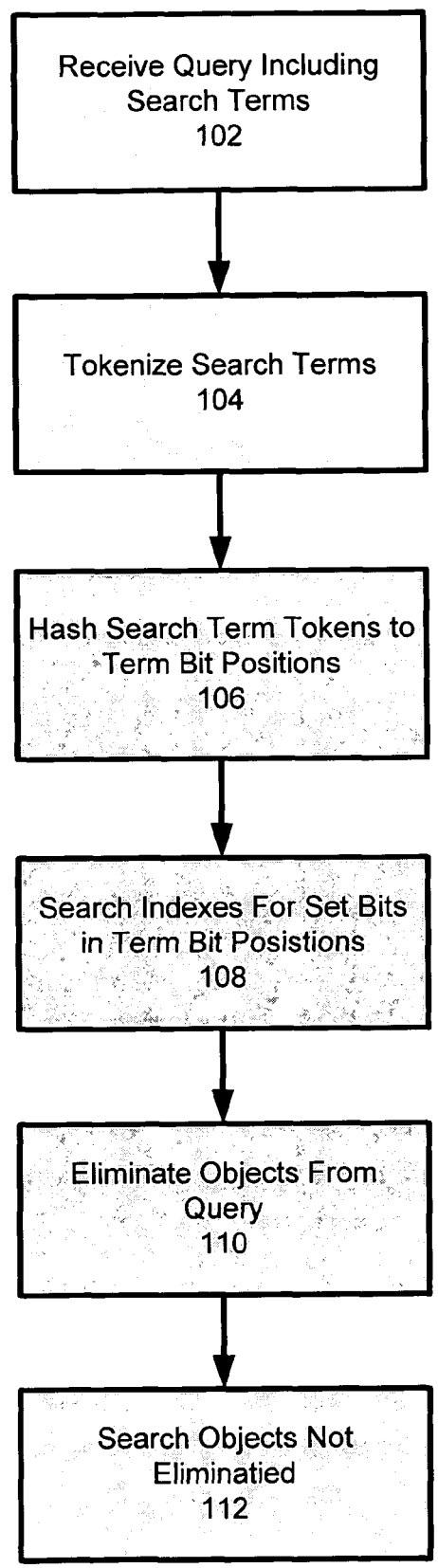
FIG. 10 is a flow diagram illustrating query processing according to one embodiment of the present invention.

One embodiment of how issuing a query over captured objects is improved by using the word indexes described above is now described with reference to FIG. 10. In block 102, a query is issued. The query—in addition to other limitations, such as content type, size, time range, and so on—will be limited to objects containing certain textual elements, such as words. For example, the query will be for all emails yesterday containing the words "liability" and "insurance."

The query can be received by the capture device 22 via user interface 34. The process described with reference to FIG. 10 can be implemented entirely within the user interface, within some query module of the user interface, or a separate query module.

In block 104, the textual search terms are tokenized in the manner described above. They may also be sub-tokenized and stemmed, as described above. In block 106, the tokens are hashed using the same hash function used to generate the word indexes, as described above. The search tokens will hash to certain bit positions of a word index. The process described with reference to blocks 104 and 106 can be carried out by a module similar or identical to the word index module 64 described above.

In block 108, a search is performed over the tag database. More specifically, the index fields of the tags associated with objects satisfying the other search criteria are examined. If all bits that the search tokens hashed to are set in a given index field of a tag, then the object associated with that tag will need to be searched. However, if not all bits that the search tokens hashed to are set in a given index field of a tag, then the object associated with that tag is, in block 110, eliminated for further consideration for the current query.

In block 112, the remaining objects are retrieved and searched for the search terms in the query. While some objects still need to be retrieved and searched, their numbers are greatly reduced by eliminating the object in block 110 that cannot contain the search terms based on their word indexes.

General Matters

In several embodiments, the capture system 22 has been described above as a stand-alone device. However, the capture system of the present invention can be implemented on any appliance capable of capturing and analyzing data from a network. For example, the capture system 22 described above could be implemented on one or more of the servers 14 or clients 16 shown in FIG. 1. The capture system 22 can interface with the network 10 in any number of ways, including wirelessly.

Figure 6:
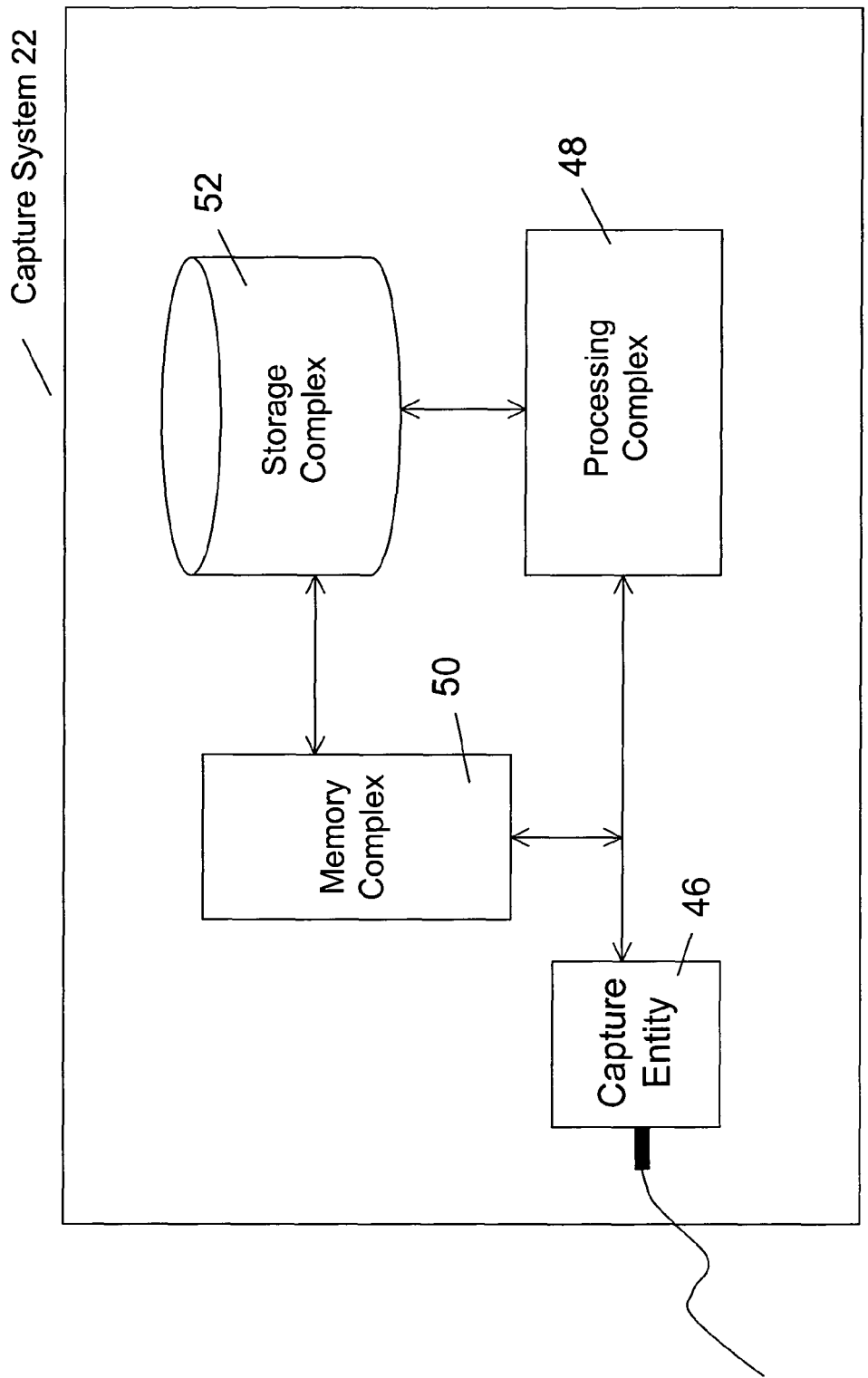
FIG. 6 is a block diagram illustrating an example hardware architecture for a capture system according to one embodiment of the present invention.

In one embodiment, the capture system 22 is an appliance constructed using commonly available computing equipment and storage systems capable of supporting the software requirements. In one embodiment, illustrated by FIG. 6, the hardware consists of a capture entity 46, a processing complex 48 made up of one or more processors, a memory complex 50 made up of one or more memory elements such as RAM and ROM, and storage complex 52, such as a set of one or more hard drives or other digital or analog storage means. In another embodiment, the storage complex 52 is external to the capture system 22, as explained above. In one embodiment, the memory complex stored software consisting of an operating system for the capture system device 22, a capture program, and classification program, a database, a filestore, an analysis engine and a graphical user interface.

Thus, a capture system and a word indexing scheme for the capture system have been described. In the forgoing description, various specific values were given names, such as "objects," and various specific modules, such as the "words index module" and "tokenizer" have been described. However, these names are merely to describe and illustrate various aspects of the present invention, and in no way limit the scope of the present invention. Furthermore various modules can be implemented as software or hardware modules, or without dividing their functionalities into modules at all. The present invention is not limited to any modular architecture either in software or in hardware, whether described above or not.

The invention claimed is:

1. A method to be performed by a processor in an electronic environment, comprising:
   receiving a query for an object captured by a capture system, the query including at least one search term, wherein a content type of the object is determined and the content type is positioned in a content field of a tag associated with the object;
   hashing the at least one search term to a term bit position using a hash function; and
   eliminating at least one other object from the query using a word index associated with the at least one other object, the word index comprising a plurality of bits, if a bit in the term bit position is not set, wherein eliminating at least one other object from the query comprises performing a search over a tag database containing tags associated with the captured objects.

2. The method of claim 1, further comprising retrieving at least one object, wherein a second word index associated with the retrieved object included a set bit in the term bit position.

3. The method of claim 1, wherein each tag in the tag database comprises an index field, the index field including a plurality of bits, wherein at least one of the bits is set.

4. The method of claim 3, wherein the at least one set bit has a value of "1".

5. A method to be performed by a processor in an electronic environment, the method comprising:
   capturing an object being transmitted over a network, wherein a content type of the object is determined and the content type is positioned in a content field of a tag associated with the object;
   extracting text contained in the captured object;
   generating a plurality of tokens from the extracted text;
   hashing the plurality of tokens to a plurality of bit position values; and
   creating a word index to be associated with the captured object by setting bits of a bit vector corresponding to the plurality of bit position values, wherein generating the plurality of tokens comprises tokenizing the extracted text using a context-aware parser, and wherein the context-aware parser uses a list of patterns associated with a content type of the captured object to sub-tokenize at least one of the tokens generated from the extracted text.

6. The method of claim 5, wherein the context-aware parser uses a list of separators associated with a content type of the captured object.

7. The method of claim 5, further comprising inserting the word index into a tag associated with the captured object.

8. The method of claim 7, further comprising storing the captured object in a canonical object store and storing the tag associated with the captured object in a tag database.

9. The method of claim 5, further comprising:
   receiving a query including a search term;
   hashing the search term to a term bit position of the bit vector; and
   eliminating the captured object from the query by observing that a bit in the term bit position is not set in the word index contained in the tag associated with the captured object.

10. A capture system comprising:
    one or more capture modules including a network interface card to capture an object being transmitted over a network, wherein a content type of the object is determined and the content type is positioned in a content field of a tag associated with the object;
    a text extractor to extract text contained in the captured object;
    a tokenizer to generate a plurality of tokens from the extracted text;
    a sub-tokenizer to sub-tokenize the plurality of tokens comprises using a context-aware parser; and
    an index generator to create a word index by hashing the plurality of tokens to a plurality of bit position values and setting bits of a bit vector corresponding to the plurality of bit position values, wherein the context-aware parser uses a list of patterns associated with a content type of the captured object to sub-tokenize at least one of the tokens generated from the extracted text.

11. The capture system of claim 10, wherein the context-aware parser uses a list of separators associated with a content type of the captured object.

12. The capture system of claim 10, wherein the index generator also inserts the word index into a tag associated with the captured object.

13. The capture system of claim 12, further comprising an object store to store the captured object and a tag database to store the tag associated with the captured object.

14. A machine-readable medium having stored thereon data representing instructions that, when executed by a processor, cause the processor to perform operations comprising:
    receiving a query for an object captured by a capture system, the query including at least one search term, wherein a content type of the object is determined and the content type is positioned in a content field of a tag associated with the object;
    hashing the at least one search term to a term bit position using a hash function; and
    eliminating at least one other object from the query using a word index associated with the at least one other object, the word index comprising a plurality of bits, if a bit in the term bit position is not set, wherein eliminating the at least one other object from the query comprises performing a search over a tag database containing tags associated with the capture objects.

15. The machine-readable medium of claim 14, wherein the instructions further cause the processor to retrieve at least one object, wherein a second word index associated with the retrieved object included a set bit in the term bit position.

16. The machine-readable medium of claim 14, wherein each tag in the tag database comprises an index field, the index field including a plurality of bits, wherein at least one of the bits is set.

17. The machine-readable medium of claim 16, wherein the at least one set bit has a value of "1".

18. A machine-readable medium having stored thereon data representing instructions that, when executed by a processor of a capture system, cause the processor to perform operations comprising:
    extracting text contained in a captured object, wherein a content type of the object is determined and the content type is positioned in a content field of a tag associated with the object;
    generating a plurality of tokens from the extracted text;
    hashing the plurality of tokens to a plurality of bit position values; and
    creating a word index to be associated with the captured object by setting bits of a bit vector corresponding to the plurality of bit position values, wherein generating the plurality of tokens comprises tokenizing the extracted text using a context-aware parser, and wherein the context-aware parser uses a list of patterns associated with a content type of the captured object to sub-tokenize at least one of the tokens generated from the extracted text.

19. The machine-readable medium of claim 18, wherein the context-aware parser uses a list of separators associated with a content type of the captured object.

20. The machine-readable medium of claim 18, wherein the instructions further cause the processor to insert the word index into a tag associated with the captured object.

21. The machine-readable medium of claim 20, wherein the instructions further cause the processor to store the captured object in a canonical object store and storing the tag associated with the captured object in a tag database.

22. The machine-readable medium of claim 18, wherein the instructions further cause the processor perform operations comprising:
    receiving a query including a search term;
    hashing the search term to a term bit position of the bit vector; and
    eliminating the captured object from the query by observing that a bit in the term bit position is not set in the word index contained in the tag associated with the captured object.

\* \* \* \* \*